United States Patent [19]

Maeda et al.

[11] Patent Number: 4,889,728
[45] Date of Patent: Dec. 26, 1989

[54] CHEWING GUM AND A METHOD OF MANUFACTURING THE SAME

[75] Inventors: Masao Maeda, Hyogo; Michiyo Fukuse; Tohru Miyaaki, both of Osaka; Toshio Miyake, Okayama, all of Japan

[73] Assignees: Kanebo, Ltd.; Kabushiki Kaisha Hayashibara Seibutsu Kagaku Kenkyujo, both of Japan

[21] Appl. No.: 168,783

[22] Filed: Mar. 16, 1988

[51] Int. Cl.⁴ .............................................. A23G 3/30
[52] U.S. Cl. ....................................... 426/5; 426/104; 426/112; 426/390
[58] Field of Search ................... 426/3, 5, 4, 104, 112, 426/390

[56] References Cited

U.S. PATENT DOCUMENTS

| | | | |
|---|---|---|---|
| 4,117,645 | 10/1978 | Phillips | 426/5 |
| 4,161,544 | 7/1979 | Kaul | 426/5 |
| 4,405,647 | 9/1983 | Fisher et al. | 426/4 |
| 4,753,805 | 6/1988 | Cherukuri et al. | 426/5 |

*Primary Examiner*—Jeanette Hunter
*Attorney, Agent, or Firm*—Armstrong, Nikaido, Marmelstein, Kubovcik & Murray

[57] ABSTRACT

This invention provides a chewing gum kit which consists of a special powdery chewing gum component (A) containing hydrous crystalline maltose as formed by hydrating the anhydrous crystalline maltose incorporated in the chewing gum texture and a liquid component (B) for contacting with the chewing gum to congeal the powder at the site of contact and thereby provide a mass of chewing gum, so that the powdery chewing gum is easily converted to a mass of chewing gum on bringing both components together and applying a given force.

12 Claims, 3 Drawing Sheets

4,889,728

CHEWING GUM AND A METHOD OF MANUFACTURING THE SAME

TECHNICAL FIELD

The present invention relates to a chewing gum which can be readily formed into a mass by moisturization and application of an external force and to a method of manufacturing the same.

Chewing gum is generally made in the form of a slab or block which the consumer puts directly into the mouth and chews. Today a large variety of flavored chewing gums are available and it is very difficult to enter the market with just a gum having flavor. However, producing gum having additional qualities such as an unusual appearance or eating mode, rather than taste, are often crucial sales points.

Therefore, if the industry could supply a powdery chweing gum which the consumer himself could form easily into a mass by resorting to a simple procedure such as adding water to a composition, the product would give the consumer the pleasure of molding something by himself and, at the same time, allows him to enjoy the taste of the gum. In view of the above, there has been a standing demand for chewing gum powders which may be easily molded into masses by the addition of water or the like. However, conventional powdery chewing gum possesses a texture that is too tight to allow added water to penetrate deep into the body of the powder upon mere shaking, so that the particles are not sufficiently bound together. This means that the desired mass cannot be produced. To improve the binding effect, it might be contemplated to increase the initial moisture content of the gum but then the addition of water and shaking would result in a locally excess moisture content, with the consequence that the molded gum loses chewability and melts out in the mouth of the consumer. Thus, in the present state of the art, a product possessing the above mentioned qualities has not been implemented as yet.

OBJECT OF THE INVENTION

It is, therefore, an object of the invention to provide a chewing gum which the consumer can make from a mass chewing gum powder, and a method of manufacturing the same.

DISCLOSURE OF THE INVENTION

With the intent to accomplish the above object, the present invention is directed, in one aspect, to:

a kit comprising a powdery chewing gum component (A) and liquid component (B):

(A) The powdery chewing gum component includes a gum base, hydrous crystalline maltose, a humectant and a gum substance (B) The liquid component is used to supply said powdery chewing gum component (A) with moisture upon contact therewith to congeal said component (A) at the site of contact and, thereby, convert the component (A) into a mass of chewing gum and, in another aspect, the invention relates to:

a method of producing a combination chewing gum which comprises providing a chewing gum composition comprising a gum base, anhydrous crystalline maltose (for example, the crystalline α-maltose described in Japanese Patent Gazette Kokai Sho 61-35800), a humectant and a gum, molding said chewing gum composition into a predetermined shape, hydrating the chewing gum to convert the anhydrous crystalline maltose contained in the molded chewing gum to hydrated crystalline maltose and pulverizing the hydrated chewing gum. The method includes packaging a liquid component having a predetermined composition together with the chewing gum component.

EFECTS OF THE INVENTION

The chewing gum kit according to the present invention comprises, in combination, a special chewing gum composition (A) and a liquid component (B) adapted to convert said powdery chewing gum component (A) to a mass of chewing gum, with the result that a mass of chewing gum can be easily formed by mere addition of a playful action such as shaking. The chewing gum component (A) contains hydrous maltose prepared by hydrating anhydrous maltose, whereby the structure of the gum component (A) is converted from a dense structure to a porous, hygroscopic structure. Therefore, the consumer can not only enjoy the chewing quality of this mass of chewing gum but can also enjoy the process of making a chewing gum prior to chewing.

BEST MODE FOR CARRYING OUT THE INVENTION

The specific powdery chewing gum component (A) present in the kit of the invention can be obtained, for example, in the following manner. First, a gum base is maintained at a temperature of 40°–50° C. and charged into a mixer (kneader), then a humectant, a gum and anhydrous crystalline maltose are added, and the mixture is kneaded thoroughly. When the whole mixture has acquired approximate homogeneity, additives such as a flavor and a colorant are added, and the resultant mixture is kneaded thoroughly until uniform smoothness is attained. There is thus obtained a solid-form chewing gum. Then, said solid-form chewing gum is molded into an optionally selected shape and allowed to stand under high humidity conditions, for example in an atmosphere of 80% humidity, for 5 days. As a result, the anhydrous crystalline maltose in the molded chewing gum absorbs moisture in the atmosphere or in the chewing gum during the period of the above-mentioned standing and turns into hydrous crystalline maltose, whereby a hydrated chewing gum is obtained.

Figure 5:
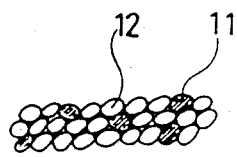
FIGS. 5 and 6 show schematic view illustrating the change in texture of the powdery chewing gum component (A) of this invention.
Figure 6:
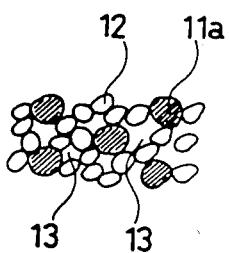

The above hydrated chewing gum is now in a swollen state as a result of standing under high humidity conditions and has a whitish appearance. When held between fingers, it feels dry and crisp and porous. This swelling is supposedly due to the following mechanisms. Thus, the molded chewing gum before hydration has a compact or dense structure schematically shown in FIG. 5. In the figure, 11 indicates anhydrous crystalline maltose and 12 indicates other gum components. After hydration, on the other hand, the dense structure is destroyed, as schematically shown in FIG. 6. In other words, the hydrous crystalline maltose 11a now having an increased volume as a result of hydration provides spaces or voids 13 between it and other gum components to thereby destroy the above-mentioned dense structure and give rise to formation of a porous structure.

In accordance with the invention, the molded chewing gum having an optionally selected shape is hydrated in a preparatory step for the preparation of the powdery chewing gum component (A), whereby its dense structure is destroyed and it is converted to a hydrated chewing gum which has high porosity and can be easily disintegrated. Therefore, this hydrated chewing gum can be pulverized very easily.

Accordingly, the powdery chewing gum component (A) can be obtained by comminuting the above-mentioned hydrated chewing gum to a powder in a granulator or the like.

As the humectant to be used in the above process, there may be mentioned sugar alcohols, glycerin and corn syrup, for instance, while mere addition of water may be sufficient. Among then, sorbitol and glycerin are suitable. They may be used either alone or in combination. Sorbitol is generally used in the form of an aqueous sorbitol solution having a concentration of 70% by weight (hereinafter "%" for short), suitably in an amount of not more than 15% based on the whole amount of the chewing gum. When it is used in an amount exceeding 15%, the chewing gum becomes tacky and has a tendency toward reduced moldability. Also when the above-mentioned glycerin is used, its use in an amount not more than 15% based on the whole amount of the chewing gum is suitable for the same reasons as mentioned above. Further, when the above-mentioned corn syrup is used, it is generally used in the form of a 70% aqueous syrup solution, suitably in an amount of not more than 20%.

In the above process, the kind of the gum base is not critical but is suitably used in an amount of 15-85% based on the whole chewing gum. In amounts less than 15%, that sticky feeling of a chewing gum cannot be obtained upon chewing whereas, in amounts exceeding 85%, the moldability of the gum tends to decrease.

Further, in the above process, anhydrous crystalline maltose is preferably used in an amount of 30-80%, most preferably 40-75%, on the whole chewing gum basis in view of the its effectiveness. Part of anhydrous crystalline maltose may be replaced with other sugar or sugars, such as sucrose, glucose and lactose. In this case, the proportions of anhydrous crystalline maltose and other sugars, are expressed in terms of anhydrous crystalline maltose/other sugars (weight ratio), which are preferably 100/0 to 4/96, in particular 100/0 to 15/85. When the proportions of other sugars exceed the above range, the gum texture becomes dense as does ordinary chewing gum species, and hence the water permeability becomes poor.

The gum in the above process, is selected from the group consisting of pullulan, gelatin and gum arabic, among others. These gums prevent the chewing gum, obtained upon contact of the powdery chewing gum component (A) with the liquid component (B), from abruptly becoming soft in the mouth and thus providing the chewing gum with chewing property. The above gum, when present in amounts of about 0.1-5% to the gum base, gives a favorable chewing property upon chewing.

The liquid component (B), which is to be used in combination with the above-mentioned powdery chewing gum component (A), is brought into contact with the powdery chewing gum component (A) to bind particles of the powdery chewing gum component at the sites of contact to give a lumpy chewing gum. The liquid component may be simply water or an aqueous solution of a colorant, a flavor and/or the like.

The above liquid component (B) is generally filled or packed tightly in a tightly closable container, such as a pouch made of a soft plastic material, for example polyethylene, or a fountain pen filler-shaped container, and combined with the above-mentioned powdery chewing gum component (A).

Figure 1:
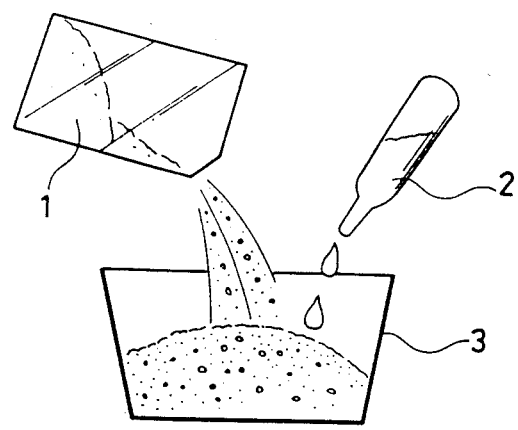
FIGS. 1, 2, 3 and 4 show schematic views illustrating the formation of a chewing gum in accordance with one embodiment of the invention.
Figure 2:
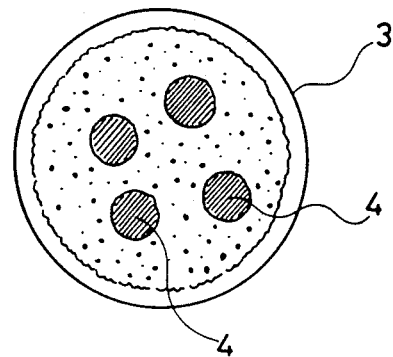
Figure 3:
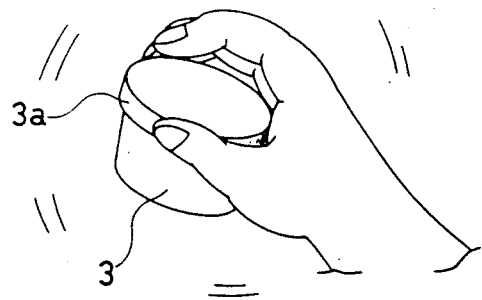
Figure 4:
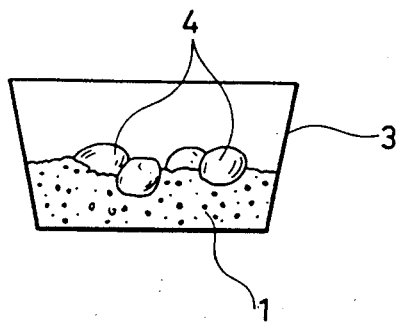

The chewing gum according to the invention consists of a powdery chewing gum component (A) and the liquid component (B), as mentioned above, and can be chewed after taking pleasure in making a lumpy chewing gum, for example in the following manner. Thus, as shown in FIG. 1, the powdery chewing gum composition (1) is first poured, with shaking, into an optionally selected vessel 3, then the tightly closed container, e.g. a fountain pen filler-shaped container, containing the liquid component 2 is opened and the liquid component is dropped onto the surface of the powdery chewing gum component mass 1 at appropriate intervals. An overhead view is shown in FIG. 2. Liquid component 2 is caused to come into contact with the powdery chewing gum composition 1 as indicated by 4. The above-mentioned vessel 3 is then covered with a lid 3a, as shown in FIG. 3 and, as shown, held by the hand and shaken several times. Thereafter, the lid 3a is removed and, as shown in FIG. 4, a plurality of approximately spherical chewing gum lumps resulting from congealment of those portions 4 of the powdery chewing gum component 1 that have come into contact with the liquid component 2. The gum lumps occur in admixture with that portion of the powdery chewing gum component 1 which has not been converted to a lumpy chewing gum. The consumer can then remove the approximately spherical chewing gum lumps and chew them while enjoying their chewing property in the mouth, like the conventional chewing gum.

In addition to the shaking with a lid 3a provided, as mentioned above, the above-mentioned conversion to a chewing gum ready for chewing may be effected also by gentle stirring with something like a rod or by using a vessel such that the body and lid, when united, take a spherical form and playing catch ball or by placing the gum composition and the liquid component in a vessel something like a yoyo and shaking the same.

The hydration of the powdery chewing gum composition (A) can be effected not only partly, as mentioned above, but also totally so that the whole powdery chewing gum can be converted to a lump state.

A colorant, the color of which can change depending on the pH of the powdery chewing gum composition may be added (A) simultaneously with the addition of the liquid component (B) a pH adjusting agent. Upon contact with the powdery chewing gum component, a pH change at the site of contact will cause the resultant lumpy chewing gum to assume or change to a color different from the color of the powdery chewing gum component (A). Such a visual pleasure renders the chewing gum even more preferable.

The colorant, the color of which can vary depending on pH, may be, for example, the colorants shown below in Table 1.

TABLE 1

| Colorant | | Color | |
|---|---|---|---|
| | | Acidic pH | Alkaline pH |
| Colorant | Red No. 104 | Colorless | Red |
| | Red No. 3 | Colorless | Red |
| | Turmeric | Yellow | Red brown |
| | Red cabbage color | Red purple | Blue |
| | Cochineal | Red orange | Red purple |
| | Lac | Orange red | Red purple |
| | Corn color | Red | Red purple |
| | Grape skin color | Red | Red purple |

The range of color change can be broadened by using a colorant which is inert to pH changes in combination with the above-mentioned colorant. For instance, the combination of the above-mentioned Red No. 3 on one hand and, on the other, Yellow No. 4 and Blue No. 1, each a colorant inert to pH changes, will give a melon color to the chewing gum when it is in the acid to neutral region and a purple color when it is in the alkaline region.

In the following, an example is given together with a comparative example.

EXAMPLE 1

The materials listed below were prepared in the given proportions and a powdery chewing gum composition (A) was obtained by the process mentioned hereinbefore. This occurs as a white powder.

| | |
|---|---|
| Gum base: | 25% |
| Anhydrous crystalline maltose: | 63.3% |
| Glycerin: | 5% |
| 5% aqueous solution of pullulan: | 5% |
| Flavor: | 1% |
| Citric acid: | 0.5% |
| 5% aqueous solution of Red No. 104: | 0.2% |

Separately, a liquid component (B) was obtained by uniformly mixing the materials listed below in the given proportions. A transparent liquid is formed of.

| | |
|---|---|
| Sucrose: | 17% |
| Water: | 80% |
| Sodium bicarbonate: | 3% |

To the above powdery chewing gum composition (A), there was added dropwise 0.5 cc of the liquid component (B) and the mixture was shaken up and down and right and left several times, whereupon portions of the liquid component (B) had permeated the gum composition turning it into a spherical lump. This lump has assumed a red color. This chewing gum was found to have a good chewing property.

COMPARATIVE EXAMPLE 1

A powdery chewing gum product was obtained by kneading the materials listed below in the given proportions at 95° C. for 1 hour and then pulverized in the conventional manner.

| | |
|---|---|
| Gum base: | 19% |
| Sucrose: | 77.7% |
| 70% aqueous solution of sorbitol: | 1.5% |
| Flavor: | 0.8% |
| Acid: | 1% |

Water (0.5 cc) was added dropwise to the above powdery chewing gum and the mixture was shaken up and down and right and left several times. Although the water was held among particles of the powdery chewing gum, the phenomenon regarding the formation of particles of the powdery chewing lump chewing gum could not be observed.

We claim:

1. A kit comprising:
   (A) a powdery chewing gum composition, and
   (B) a liquid component, wherein (A) and (B) are separately contained in said kit;
   said powdery chewing gum composition comprising a gum base, hydrous crystalline maltose, obtained by hydrating anhydrous crystalline maltose, a humectant and a gum selected from the group consisting of pullulan, gelatin and gum arabic;
   said liquid component comprising water wherein (A) and (B) are mixed at time of use.

2. A kit according to claim 1 wherein said humectant is selected from the group consisting of corn syrup, sugar alcohol and glycerine.

3. The kit according to claim 1 wherein said gum is pullulan.

4. The kit according to claim 1 wherein said powdery chewing gum composition (A) further comprises a colorant which varies its color with changes in the pH, and said liquid component (B) has a pH adjusting function to alter the local pH on contact with said powdery chewing gum composition (A).

5. The kit according to claim 4 wherein the colorant is selected from the group consisting of Red No. 104, Red No. 3, turmeric, red cabbage color, cochineal, lac, corn color and grape juice color and grape skin color, or mixtures thereof.

6. The kit according to claim 2 wherein said powdery chewing gum composition (A) further comprises a colorant which varies its color with changes in the pH and wherein said liquid component (B) has a pH adjusting function to alter the local pH on contact with said powder chewing gum composition (A).

7. The kit according to claim 3 wherein said powder chewing gum composition (A) further comprises a colorant which varies its color with changes in the pH, and wherein said liquid component (B) has a pH adjusting function to alter the local pH on contact with said powder chewing gum composition (A).

8. The kit according to claim 6 wherein the colorant is selected from the group consisting of Red No. 104, Red No. 3, turmeric, red cabbage color, cochineal, lac, corn color and grape juice color and grape skin color.

9. The kit according to claim 7 wherein the colorant is selected from the group consisting of Red No. 104, Red No. 3, turmeric, red cabbage color, cochineal, lac, corn color and grape juice color and grape skin color or mixtures thereof.

10. A method of producing a chewing gum, which comprises: forming a chewing gum composition comprising a gum base, anhydrous crystalline maltose, a humectant and a gum selected from the group consisting of pullulan, gelatin and gum arabic;
    molding said chewing gum composition;
    hydrating the anhydrous crystalline maltose in the molded chewing gum composition to hydrous crystalline maltose, comminuting the chewing gum composition and placing said comminuted chewing gum composition in a first container;

placing an effective amount of a liquid component comprising water in a second container, and packaging the contained chewing gum composition and the contained liquid component together.

11. The method according to claim 10 wherein said humectant is selected from the group consisting of corn syrup, sugar alcohol and glycerine.

12. The method according to claim 10 wherein said gum is pullulan.

* * * * *